US012341288B2

(12) United States Patent
Cabañero et al.

(10) Patent No.: US 12,341,288 B2
(45) Date of Patent: Jun. 24, 2025

(54) ELECTRICAL ASSEMBLY

(71) Applicant: Lear Corporation, Southfield, MI (US)

(72) Inventors: Albert M. Cabañero, Cebu (PH); Lewis Galligan, Novi, MI (US)

(73) Assignee: Lear Corporation, Southfield, MI (US)

(*) Notice: Subject to any disclaimer, the term of this patent is extended or adjusted under 35 U.S.C. 154(b) by 390 days.

(21) Appl. No.: 18/081,138

(22) Filed: Dec. 14, 2022

(65) Prior Publication Data

US 2024/0204443 A1 Jun. 20, 2024

(51) Int. Cl.

| | |
|---|---|
| ***H01R 12/65*** | (2011.01) |
| ***H01R 12/59*** | (2011.01) |
| ***H01R 12/77*** | (2011.01) |
| ***H01R 13/506*** | (2006.01) |
| ***H01R 43/02*** | (2006.01) |
| ***H01R 43/20*** | (2006.01) |
| *H01R 13/10* | (2006.01) |

(52) U.S. Cl.

CPC ........... *H01R 13/506* (2013.01); *H01R 43/02* (2013.01); *H01R 43/20* (2013.01); *H01R 12/592* (2013.01); *H01R 12/65* (2013.01); *H01R 12/77* (2013.01); *H01R 13/10* (2013.01)

(58) Field of Classification Search

CPC ...... H01R 13/506; H01R 43/02; H01R 43/20; H01R 12/592; H01R 12/65; H01R 12/77; H01R 13/10; H01R 4/023; H01R 12/772; H01R 13/502; H01R 12/771; H01R 13/40

See application file for complete search history.

(56) References Cited

U.S. PATENT DOCUMENTS

| | | | | |
|---|---|---|---|---|
| 4,357,065 | A | 11/1982 | Kam | |
| 4,737,118 | A | 4/1988 | Lockard | |
| 6,746,269 | B1 | 6/2004 | Casses | |
| 7,040,917 | B2 | 5/2006 | Yagi | |
| 7,338,310 | B2 | 3/2008 | Kumakura | |
| 7,367,837 | B2 | 5/2008 | Pabst | |
| 7,467,970 | B2 | 12/2008 | Ikuta | |
| 7,581,979 | B2 | 9/2009 | Kumakura | |
| 7,661,980 | B2 | 2/2010 | Dietrich | |
| 7,980,872 | B1 * | 7/2011 | Smutny | H01R 13/4361 439/189 |

(Continued)

FOREIGN PATENT DOCUMENTS

| | | | |
|---|---|---|---|
| EP | 1530263 | A1 | 5/2005 |
| JP | 5134098 | B2 | 1/2013 |

*Primary Examiner* — Briggitte R. Hammond

(74) *Attorney, Agent, or Firm* — Fishman Stewart PLLC

(57) ABSTRACT

The present application relates to an electrical assembly. An assembly includes a housing, a tray, a flat cable, and a terminal subassembly. The tray may be partially disposed within the housing and may include a slot and a cavity. The tray may be formed separately from the housing. The flat cable may include an electrical conductor with an exposed portion. The terminal subassembly may include a first terminal connected to a first end of a subassembly conductor and a second terminal connected to a second end of the subassembly conductor. A portion of the flat cable may be disposed in the cavity. A first portion of the terminal subassembly may be disposed in the slot and a second portion of the terminal subassembly may be disposed in the cavity. The second terminal may be electrically connected to the exposed electrical conductor.

20 Claims, 10 Drawing Sheets

(56) References Cited

U.S. PATENT DOCUMENTS

| | | | | |
|---|---|---|---|---|
| 8,672,704 | B2 | 3/2014 | De Bruijn | |
| 8,702,443 | B2 | 4/2014 | Kajiura | |
| 9,673,546 | B2 * | 6/2017 | Okura | H01R 12/774 |
| 10,431,906 | B1 | 10/2019 | Reed | |
| 11,196,199 | B2 * | 12/2021 | Nakamura | H01R 12/7023 |
| 2019/0173219 | A1 | 6/2019 | Sakai | |
| 2021/0408712 | A1 | 12/2021 | Myer | |
| 2022/0200200 | A1 * | 6/2022 | Ito | H01R 13/631 |

* cited by examiner

ELECTRICAL ASSEMBLY

TECHNICAL FIELD

The present disclosure generally relates to electrical assemblies, including electrical connectors and/or flat cables that may, for example, be utilized in connection with and/or incorporated into vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
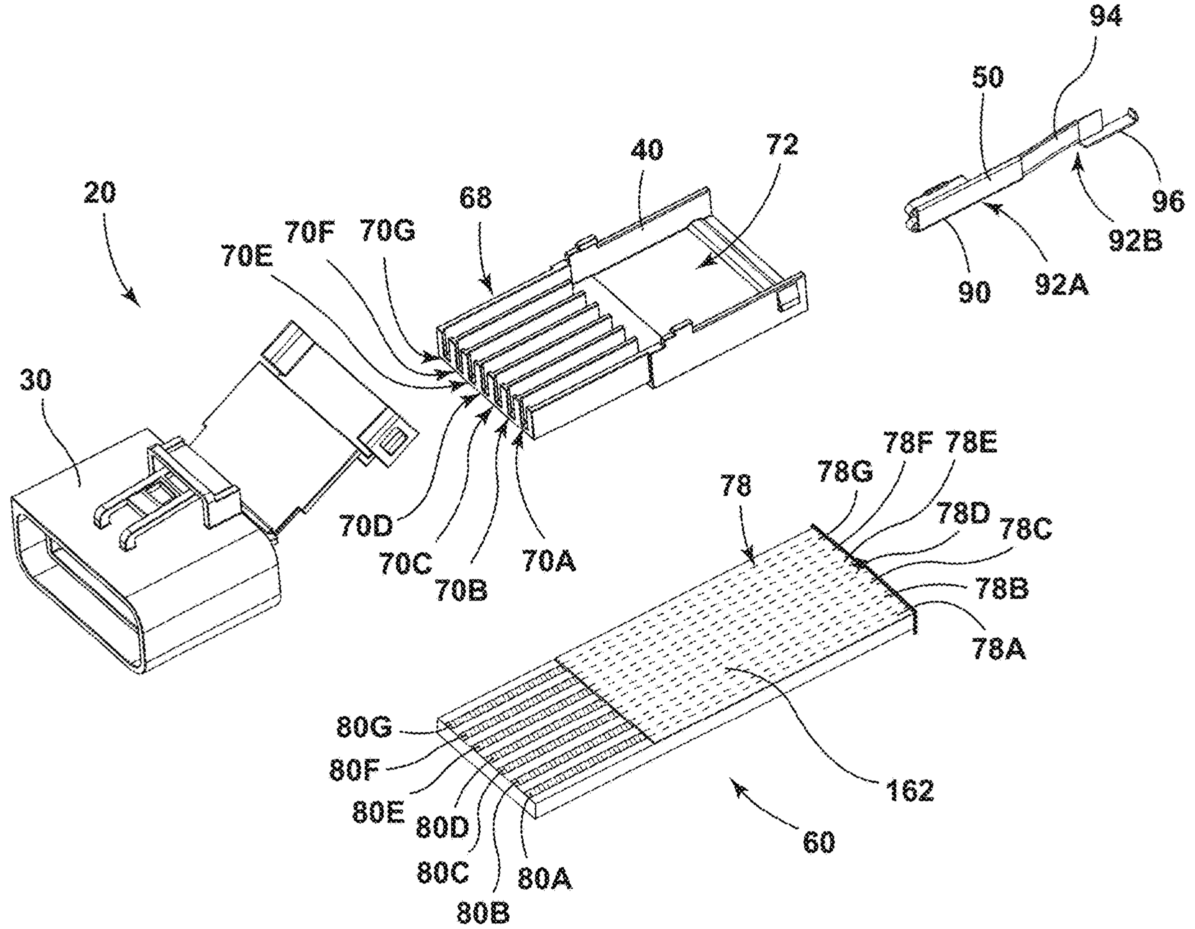
FIG. 1 is an exploded perspective view generally illustrating an embodiment of an electrical assembly according to teachings of the present disclosure.
Figure 2:
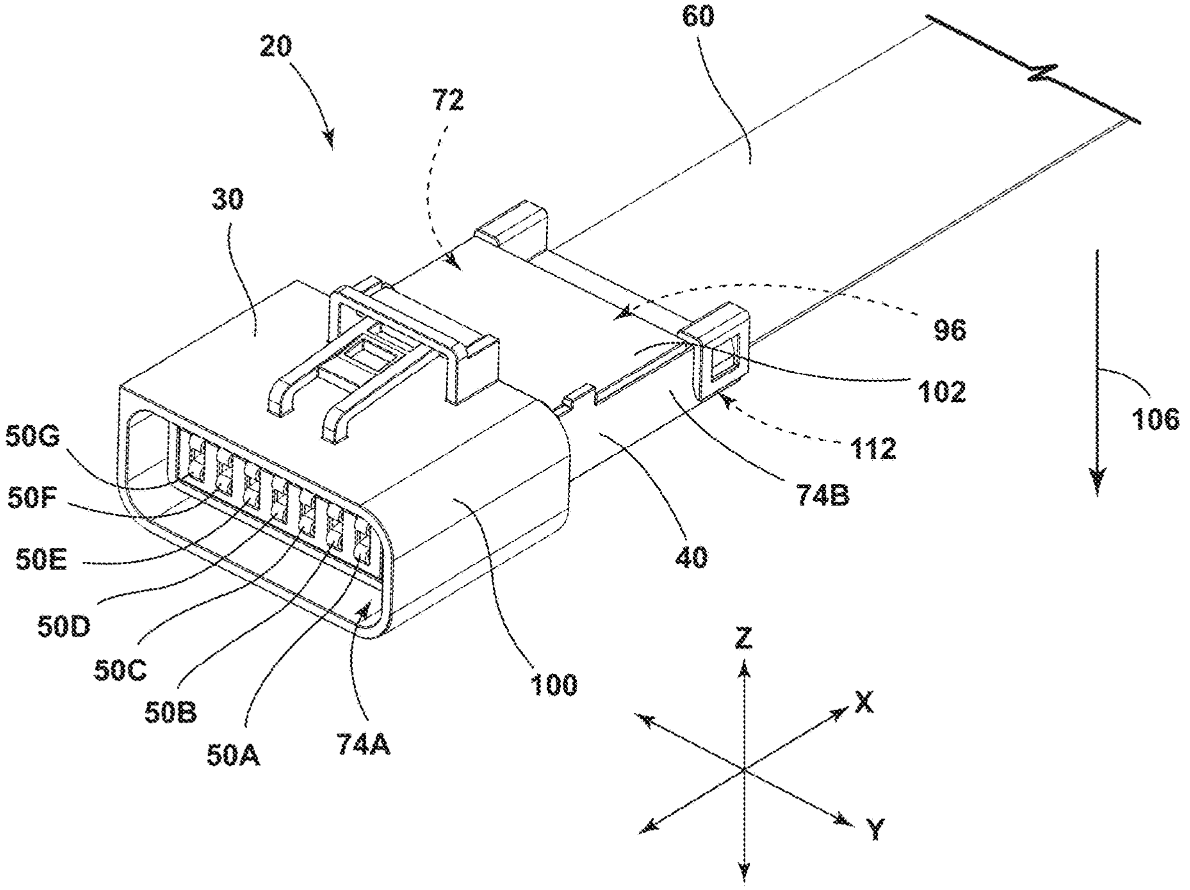
FIG. 2 is a perspective view generally illustrating an embodiment of an electrical assembly according to teachings of the present disclosure.

FIGS. 1 and 2 present an electrical assembly 20 including a housing 30, a tray 40, one or more terminal subassemblies 50 (e.g., terminal subassemblies 50A-50G), and a flat cable 60. The housing 30 is configured for connection with the tray 40, the terminal subassemblies 50, and/or the flat cable 60. The tray 40 is configured for connection with the housing 30, the terminal subassemblies 50, and/or the flat cable 60. The terminal subassemblies 50 are configured for connection with the tray 40 and/or the flat cable 60. The tray 40 includes one or more slots 70 (e.g., slots 70A-70G) and/or a cavity 72. The cable 60 includes one or more electrical conductors 78 (e.g., conductors 78A-78G) that have exposed portions 80 (e.g., exposed portions 80A-80G).

FIG. 1 shows a terminal subassembly 50 including a first terminal 90 connected to a first end 92A of a subassembly conductor 94 and a second terminal 96 connected to a second end 92B of the subassembly conductor 94. The first terminal 90 is electrically connected to the second terminal 96 via the subassembly conductor 94. In an assembled configuration, the tray 40 is partially disposed within the housing 30. A portion of the cable 60 is disposed in the cavity 72 of the tray 40. A first portion of a terminal subassembly 50 is disposed in a slot 70 of the tray 40 and a second portion of the terminal subassembly 50 is disposed in the cavity 72 of the tray 40 (see, e.g., FIGS. 13 and 14). A second terminal 96 of a terminal subassembly 50 is electrically connected to an exposed conductor portion 80 of the cable 60. The assembly 20 is shown including seven terminal subassemblies 50, slots 70, and conductors 78, however the assembly 20 may include more or less than seven terminal subassemblies 50, slots 70, and/or conductors 78.

Figure 3:
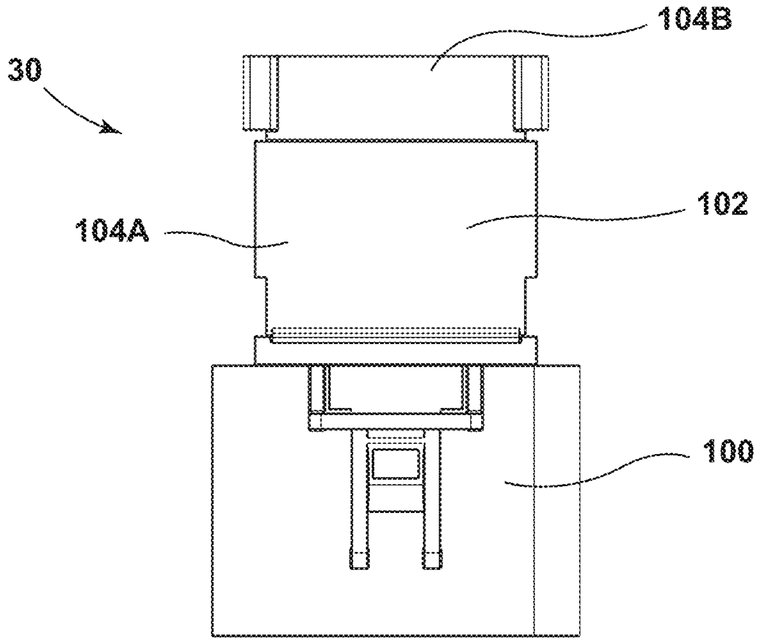
FIG. 3 is a top view generally illustrating an embodiment of a housing according to teachings of the present disclosure.
Figure 4:
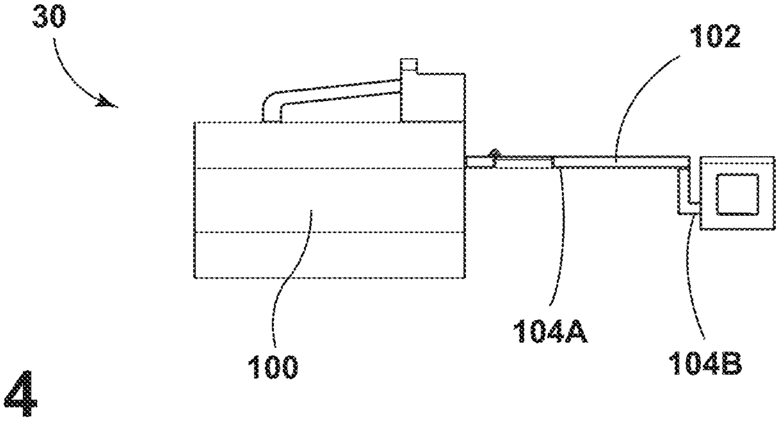
FIG. 4 is a side view generally illustrating an embodiment of a housing according to teachings of the present disclosure.
Figure 15:
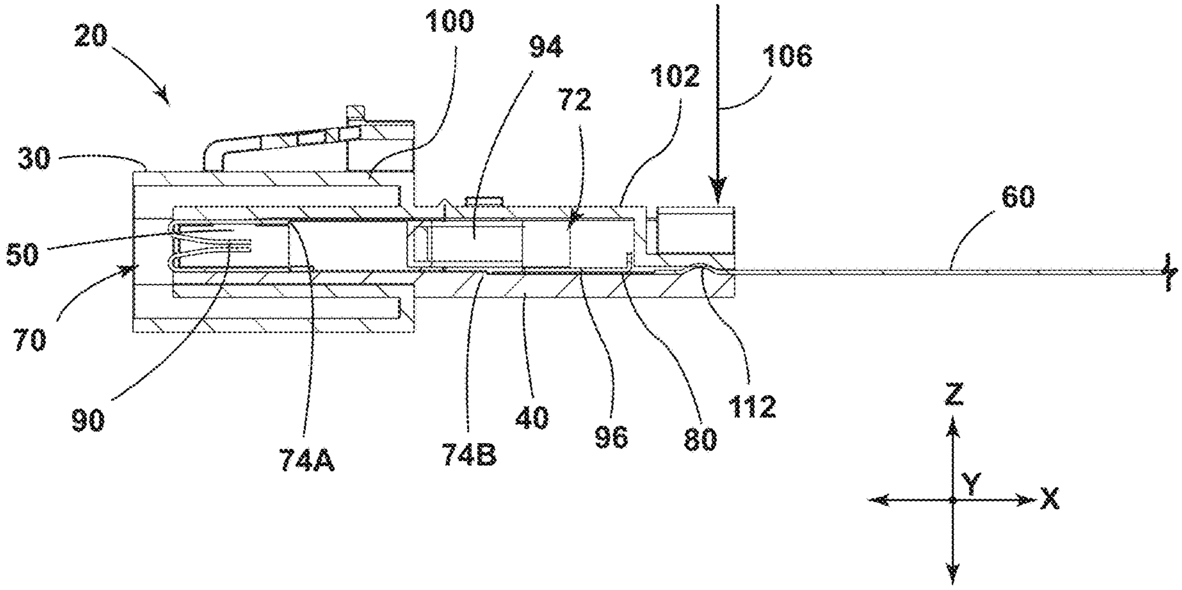

FIGS. 3 and 4 illustrate a housing 30 (e.g., an electrical connector housing) including a body 100 and a cover 102 extending from the body 100. In some implementations, the cover 102 is pivotally connected to the body 100. The cover 102 includes a planar first portion 104A and a planar second portion 104B offset from the planar first portion 104A. Referring now to FIGS. 2 and 15, the body 100 is configured to receive a first portion 74A of the tray 40 and the cover 102 is configured to connect with a second portion 74B of the tray 40. In a latched/assembled configuration, the cover 102 and the tray 40 apply a force to portions of the terminal subassemblies 50 (e.g., the second terminals 96) and a portion of the cable 60 in a direction 106 (e.g., perpendicular to the portion of the cable 60 disposed in the tray 40, parallel to the Z-axis) such that the cable 60 is restricted from moving relative to the housing 30 and/or the tray 40.

Figure 5:
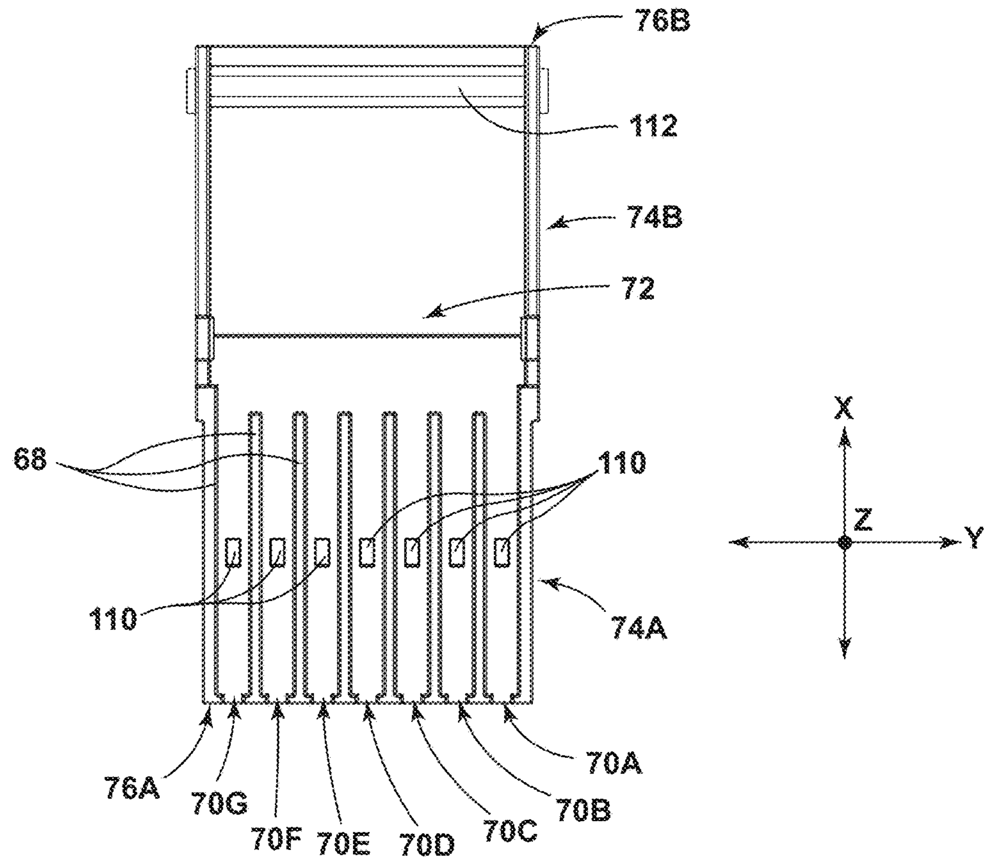
FIG. 5 is a top view generally illustrating an embodiment of a tray according to teachings of the present disclosure.
Figure 6:
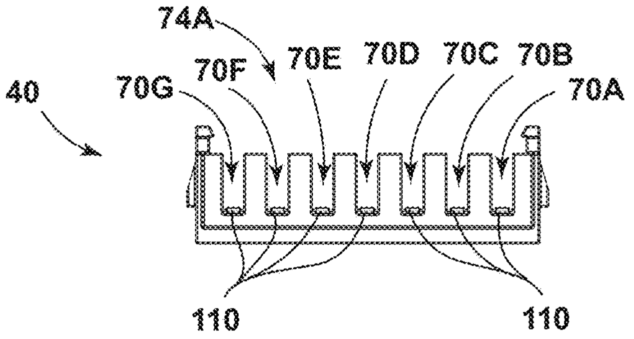
FIG. 6 is a front view generally illustrating an embodiment of a tray according to teachings of the present disclosure.
Figure 7:
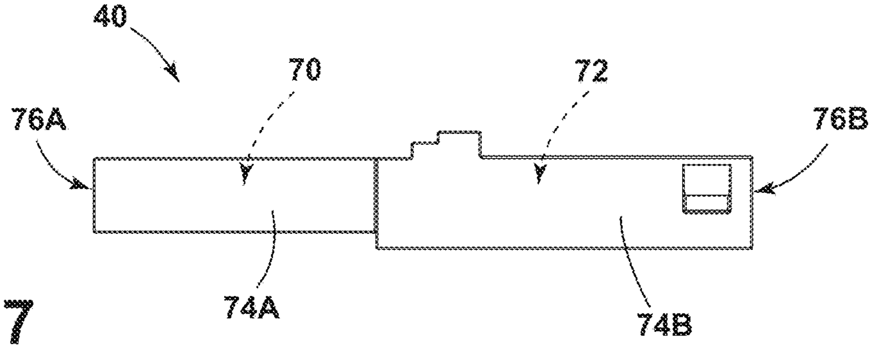
FIG. 7 is a side view generally illustrating an embodiment of a tray according to teachings of the present disclosure.

FIGS. 5-7 illustrate a tray 40 formed separately from the housing 30. The tray 40 includes a plurality of slots 70 (e.g., slots 70A-70G) that end at a cavity 72. The slots 70 are disposed in a first portion 74A of tray 40 and/or the cavity 72 is disposed in a second portion 74B of the tray 40. The slots 70 are disposed parallel to one another (e.g., parallel to the X-axis). The slots 70 may be defined by walls 68 that are parallel to an X-Z plane. The slots 70 extend from a first end 76A of the tray 40 and terminate before a second end 76B of the tray 40. Optionally, each slot 70 includes a projection 110. A projection 110 is configured to restrict a portion of the terminal subassembly 50 (e.g., a first terminal 90) from moving relative to the tray 40. The tray 40 includes a protrusion 112 disposed within the cavity 72. The protrusion

112 extends upward and is perpendicular to the slots 70 (e.g., parallel to the Y-axis). Referring now to FIGS. 2 and 15, in a latched/assembled configuration, the cover 102 of the housing 30 is engaged with the tray 40 such that the cover 102 restricts removal of the tray 40 from the housing 30. The cover 102 is latched with the tray 40 such that a portion of the cable 60 is disposed between the cover 102 and the protrusion 112. The cover 102 applies a force to portions of the terminal subassemblies 50 (e.g., the second terminals 96) and the portion of the cable 60, and the force is perpendicular to the portion of the cable 60 disposed in the cavity 72.

Figure 10:
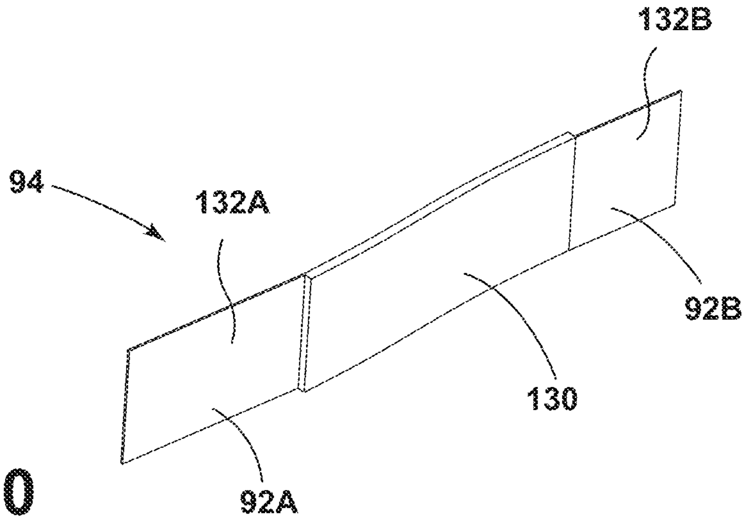
FIG. 10 is a perspective view generally illustrating an embodiment of a subassembly conductor of a terminal subassembly accordingly to teachings of the present disclosure.

FIG. 10 illustrates a subassembly conductor 94 (e.g., a flexible FFC trace connection) including an intermediate portion 130, a first planar portion 132A, and/or a second planar portion 132B. The intermediate portion 130 is non-planar in some configurations may be disposed between the first planar portion 132A and the second planar portion 132B. The first planar portion 132A and the second planar portion 132B are offset from each other in the Y-direction) The conductor 94 may include a rectangular cross-section. The conductor 94 is configured for connection with a first terminal 90 and/or a second terminal 96.

Figure 8:
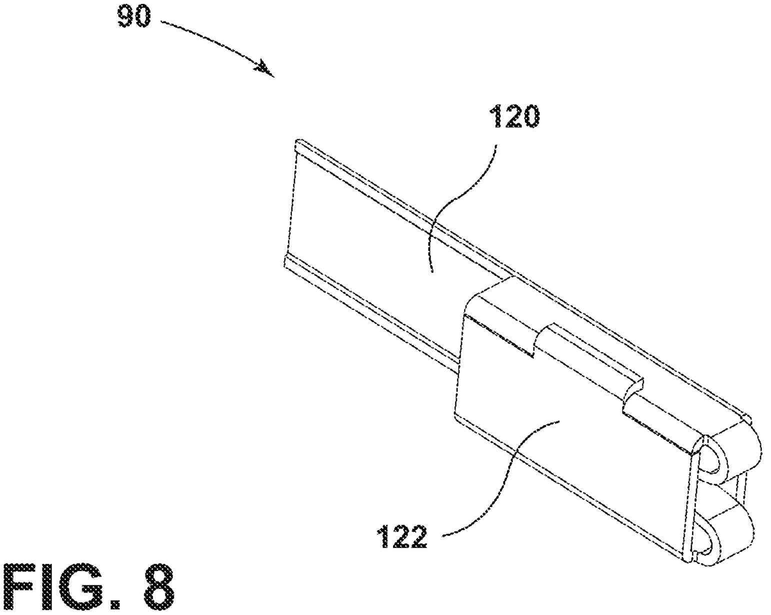
FIG. 8 is a perspective view generally illustrating an embodiment of a first terminal of a terminal subassembly accordingly to teachings of the present disclosure.
Figure 11:
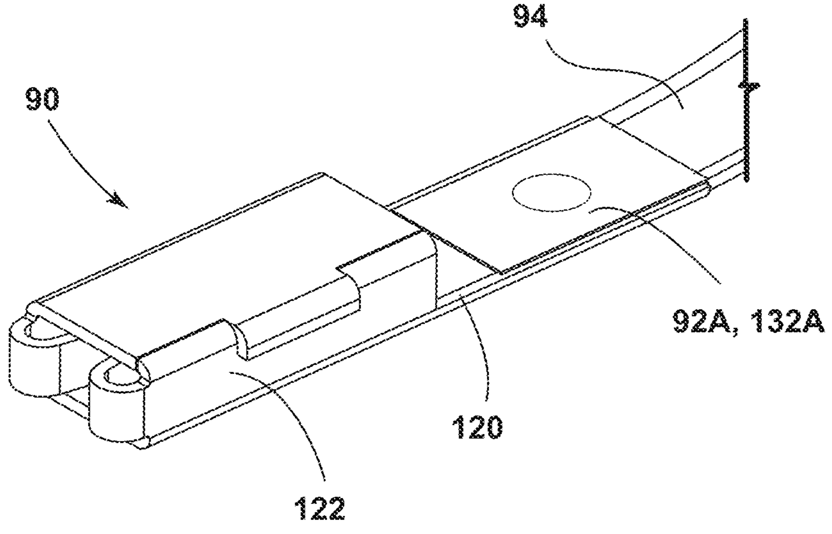
FIGS. 11 and 12 are partial perspective views generally illustrating portions of an embodiment of a terminal subassembly according to teachings of the present disclosure.

FIGS. 8 and 11 illustrate a first terminal 90 of a terminal subassembly 50, the first terminal 90 including a planar base 120 and a connector 122. The base 120 is connected with a first end 92A of the subassembly conductor 94 (e.g., the first planar portion 132A). For example and without limitation, the base 120 may be fixed with the conductor 94, such as via welding (e.g., laser welding, ultrasonic welding, etc.). The connector 122 may be configured for connection with an external object. For instance, the connector 122 may include prongs/arms that receive a terminal of an external electrical connector that connects with the housing 30.

Figure 9:
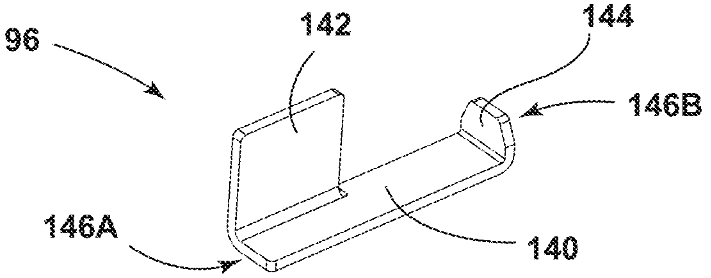
FIG. 9 is a perspective view generally illustrating an embodiment of a second terminal of a terminal subassembly accordingly to teachings of the present disclosure.
Figure 12:
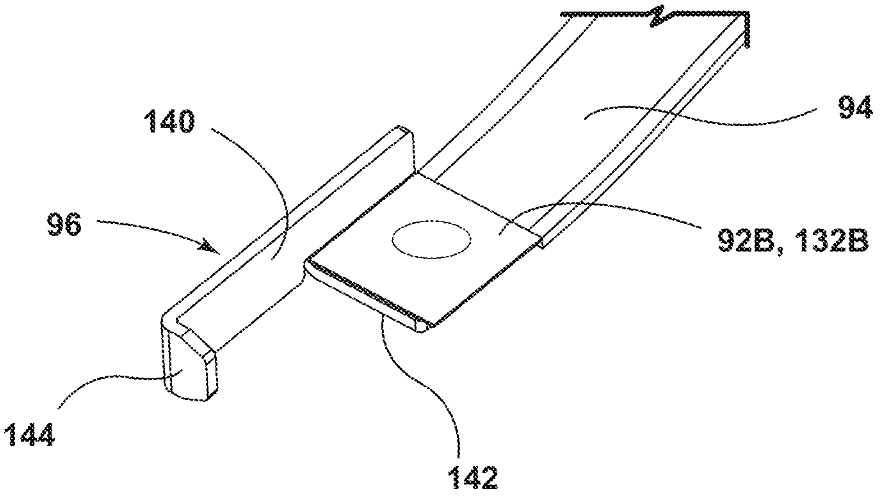

FIGS. 9 and 12 illustrate a second terminal 96 of a terminal subassembly 50, the second terminal 96 including a planar base 140, a tab 142 extending from the base 140, and a projection 144 extending from the base 140. The tab 142 is disposed proximate a first end 146A of the second terminal 96 and the projection 144 is disposed proximate a second end 146B of the second terminal 96. The tab 142 is disposed perpendicular to the projection 144 and the planar base 140. The tab 142 is connected with a second end 92B of the subassembly conductor 94 (e.g., the second planar portion 132B). For example and without limitation, the tab 142 may be fixed with the conductor 94 via welding (e.g., laser welding, ultrasonic welding, etc.).

Figure 13:
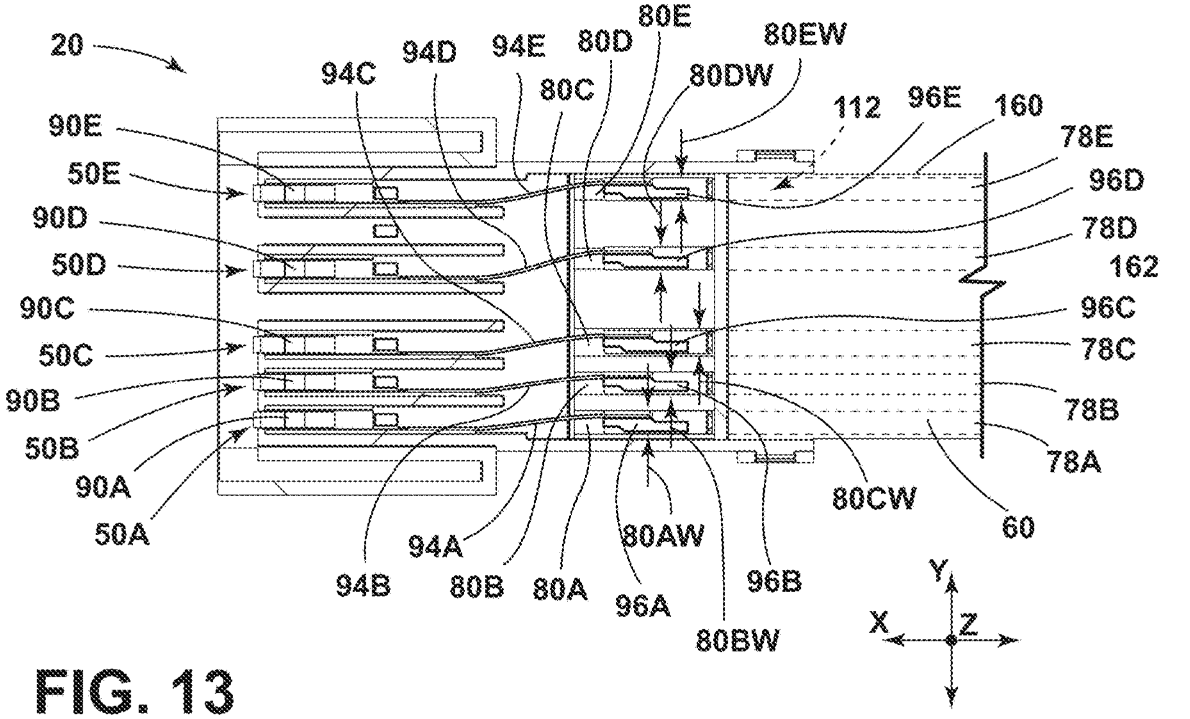
FIGS. 13-15 are cross-sectional views generally illustrating embodiments of an electrically assembly according to teachings of the present disclosure.
Figure 14:
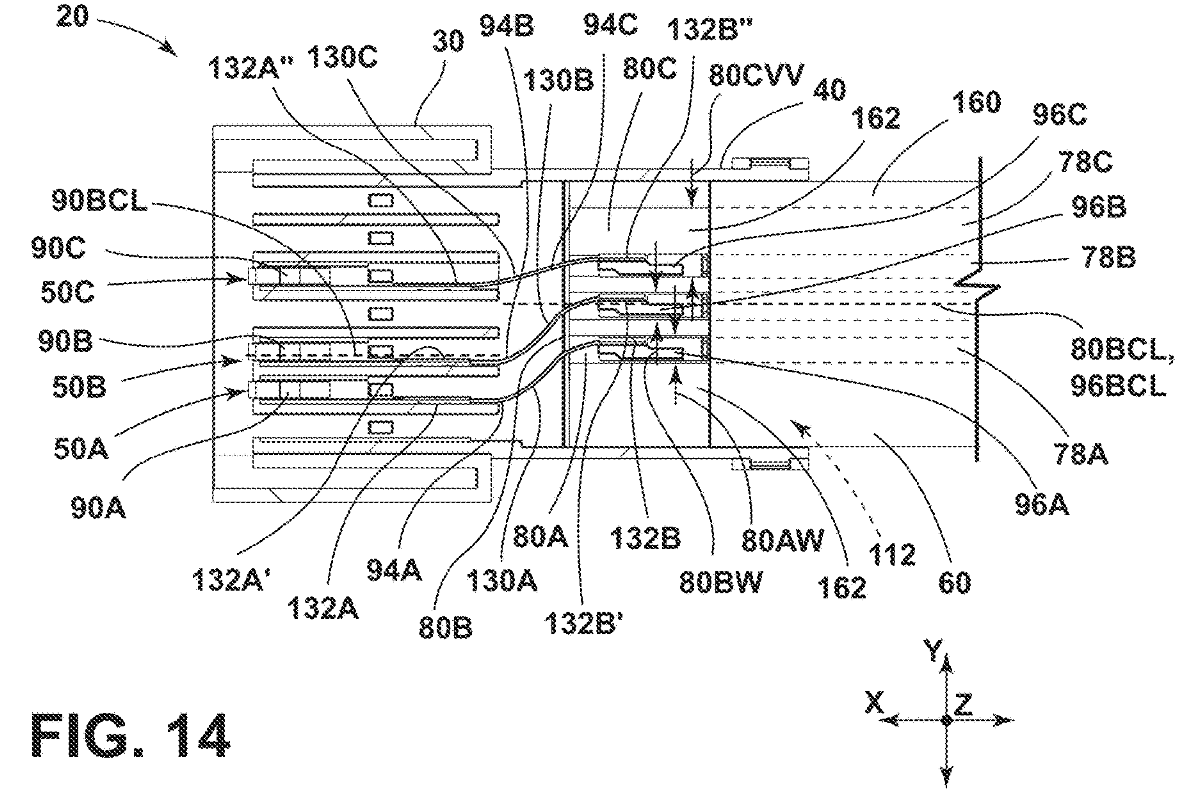

With reference to FIGS. 13 and 14, a flat cable 60 includes an elongated body 160 having one or more electrical conductors 78 and/or an insulating material 162 that electrically insulates the conductors and/or the conductors 78 from each other and/or other components. The electrical conductors 78 include exposed portions 80 that are not completely covered by insulating material 162 and/or from which insulating material 162 has been removed. The one or more conductors 78 and exposed portions 80 may be disposed in parallel with each other and/or may be substantially aligned with a common plane. The one or more conductors 78 may, in some configurations, be integrally formed with the insulating material 162. The conductor portions 80 may have varying sized widths.

Referring now to FIG. 13, in some example configurations, a cable 60 may include conductors 78 and (and corresponding exposed conductor portions 80) that have the same or different widths. For example, the cable 60 may include a first exposed conductor portion 80A having a first width 80AW, a second exposed conductor portion 80B having a second width 80BW, a third exposed conductor portion 80C having a third width 80CW, a fourth exposed conductor portion 80D having a fourth width 80DW, and/or a fifth exposed conductor portion 80E having a fifth width 80EW. In some examples, a least one of the exposed conductor portions 80 may include a width that is different than the others. For example and without limitation, the fourth exposed conductor portion 80D is shown having a width 80DW that is greater than widths 80AW-80CW, 80EW of the other exposed conductor portions 80A-80C, 80E and/or the third exposed conductor portion 80C is shown having a width 80CW greater than widths 80AW, 80BW of the first and second exposed conductor portions 80A, 80B but less than a width 80DW of the fourth exposed conductor portion 80D.

Referring now to FIG. 14, in some implementations, a cable 60 may include a first exposed conductor portions 80A having a first width 80AW, a second exposed conductor portion 80B having a second width 80BW, and/or a third exposed conductor portion 80C having a third width 80CW. The first width 80AW may be different from the second width 80BW and/or the third width 80CW. In some instances, the first width 80AW may be the same as the second width 80BW and/or the third width 80CW.

With continued reference to FIG. 14, an electrical assembly 20 is configured to be utilized with flat cables 60 including varying numbers of conductors 78 and exposed portions 80, and/or conductors 78 and exposed portions 80 having varying sized widths. For example, the same configuration of a housing 30 and a tray 40 may be used for a variety of configurations of cables 60, conductors 78, and/or exposed portions 80.

In some configurations, an assembly 20 includes a terminal subassembly 50 electrically connected to each exposed conductor portion 80 of a cable 60. The number of subassemblies 50 corresponds to the number of conductor portions 80. For example and without limitation, an electrical assembly 20 may include a first subassembly 50A electrically connected to a first exposed conductor portion 80A, a second subassembly 50B electrically connected to a second exposed conductor portion 80B, and/or a third subassembly 50C electrically connected to a third exposed conductor portion 80C. A second terminal 96A of the first subassembly 50A may be connected to the first exposed conductor portion 80A, a second terminal 96B of the second subassembly 50B may be connected to the second exposed conductor portion 80B, and/or a second terminal 96C of third subassembly 50C may be connected to the third exposed conductor portion 80C. In some examples, a second terminal 96 may be welded (e.g., via laser welding, ultrasonic welding, etc.) to an exposed conductor portion 80.

In an assembled configuration, a first planar portion 132A of a subassembly conductor 94 may be offset in a lateral direction (e.g., parallel to the Y-axis) and/or a longitudinal direction (e.g., parallel to the X-axis) from a second planar portion 132B of the subassembly conductor 94. In some examples, one or more center lines of the exposed conductor portions 80 may be aligned with center lines of second terminals 96 in the lateral direction (see center lines 80BCL, 96BCL of exposed conductor portion 80 and second terminal 96B). Additionally or alternatively, one or more of the center lines of the exposed conductor portions 80 and the second terminals 96 may be offset relative to a center line (e.g., 90BCL) of a first terminal (e.g., 90B) in the lateral direction (see, e.g., center line 90BCL of first terminal 90 offset from center lines 80BCL, 96BCL). A subassembly conductor 94 is disposed perpendicular to a portion of the flat cable 60 disposed in the cavity 72 of the tray 40 (see, e.g., FIG. 15). A subassembly conductor 94 may be curved, bent, and/or angled according to an offset between first and second terminals 90, 96. The subassembly conductor(s) 94 may be disposed in a non-parallel manner relative to the X-direction and/or may be perpendicular to an X-Y plane. The length of a subassembly conductor 94 may correspond to the offset between first and second terminals 90, 96 (e.g., greater lengths for greater offsets). An electrical assembly 20 may include subassembly conductors 94 of different lengths, such as if a cable includes conductors 78 of different widths.

In some implementations, the first planar portions 132A (e.g., first planar portions 132A-132A") of the respective subassembly conductors 94 are offset relative to the second planar portions 132B (e.g., second planar portions 132B-132B") in the lateral direction and the longitudinal direction. In some examples, the planar portions 132A, 132B of at least two subassembly conductors 94 may be offset in the lateral direction by different offset distances. For example and without limitation, planar portions 132A, 132B of the first subassembly conductor 94A may be offset by a greater distance than planar portions 132A", 132B" of the third subassembly conductor 94C. Terminal subassemblies with greater offsets may include longer subassembly conductors 94 (e.g., subassembly conductors 94 may have different lengths). The offsets of the planar portions 132A, 132B allow the assembly 20 to compensate for exposed conductor portions 80 having different sized widths 80W.

Figure 16:
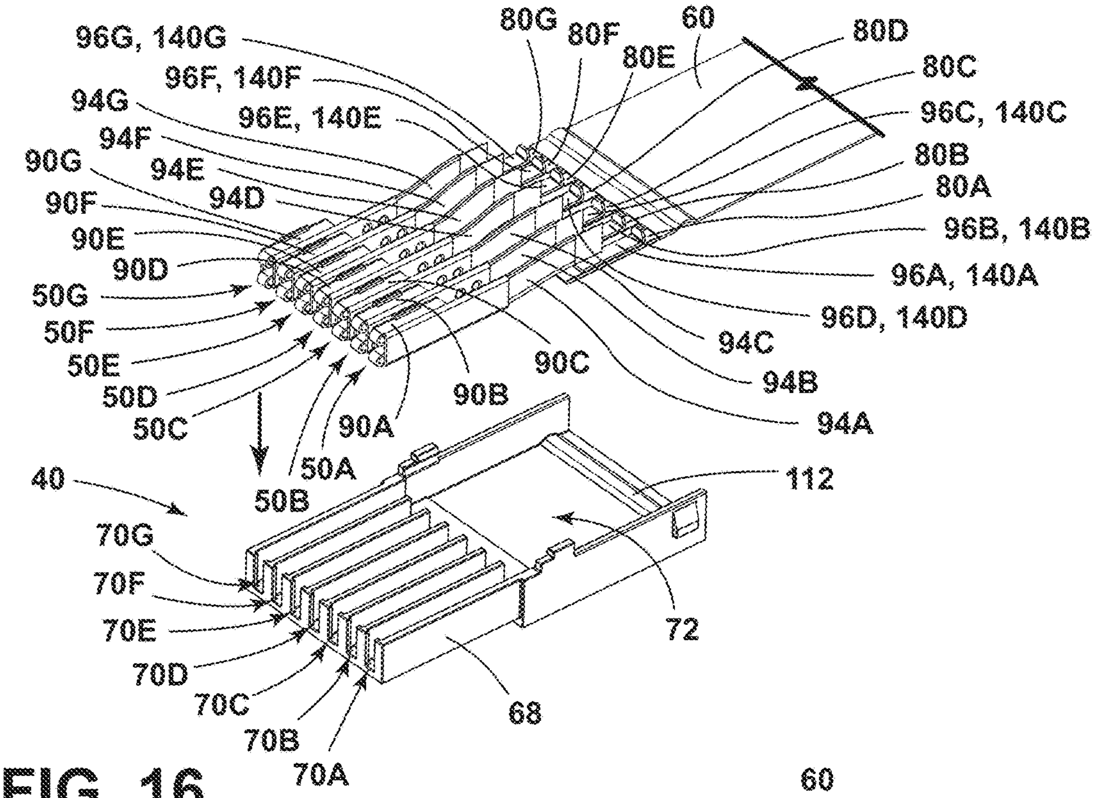
FIGS. 16-18 are perspective views generally illustrating portions of an embodiment of a method of assembling an electrical assembly according to teachings of the present disclosure.
Figure 17:
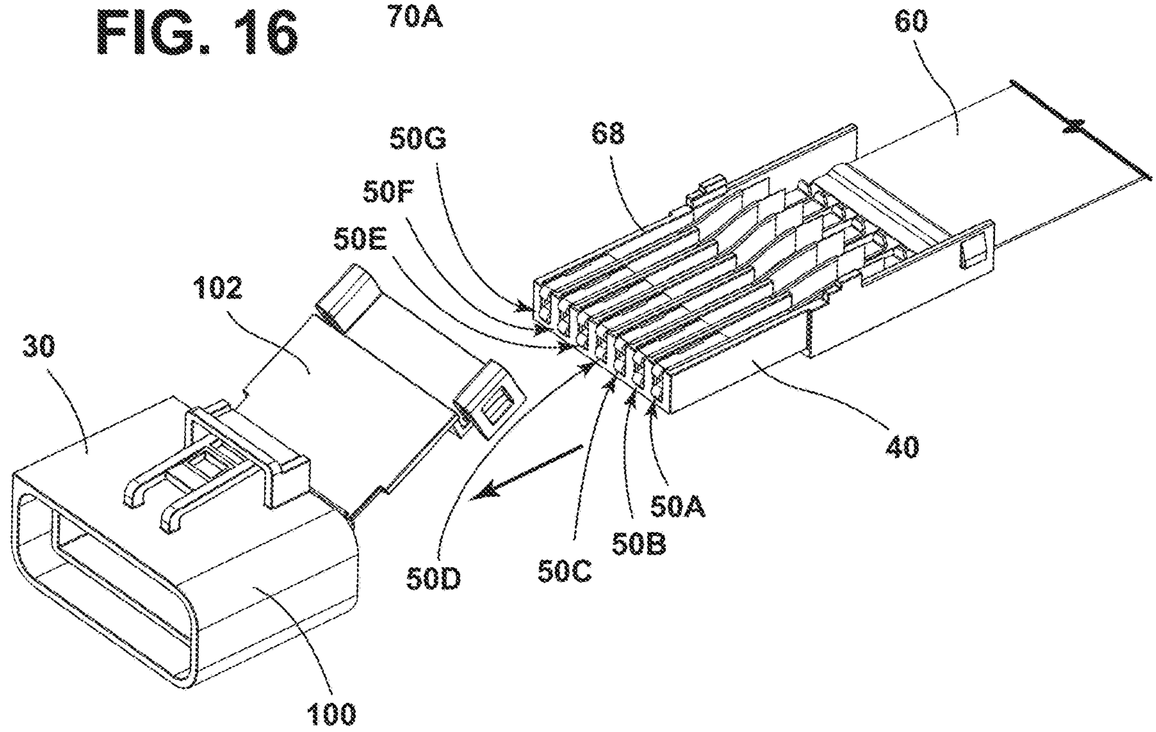
Figure 18:
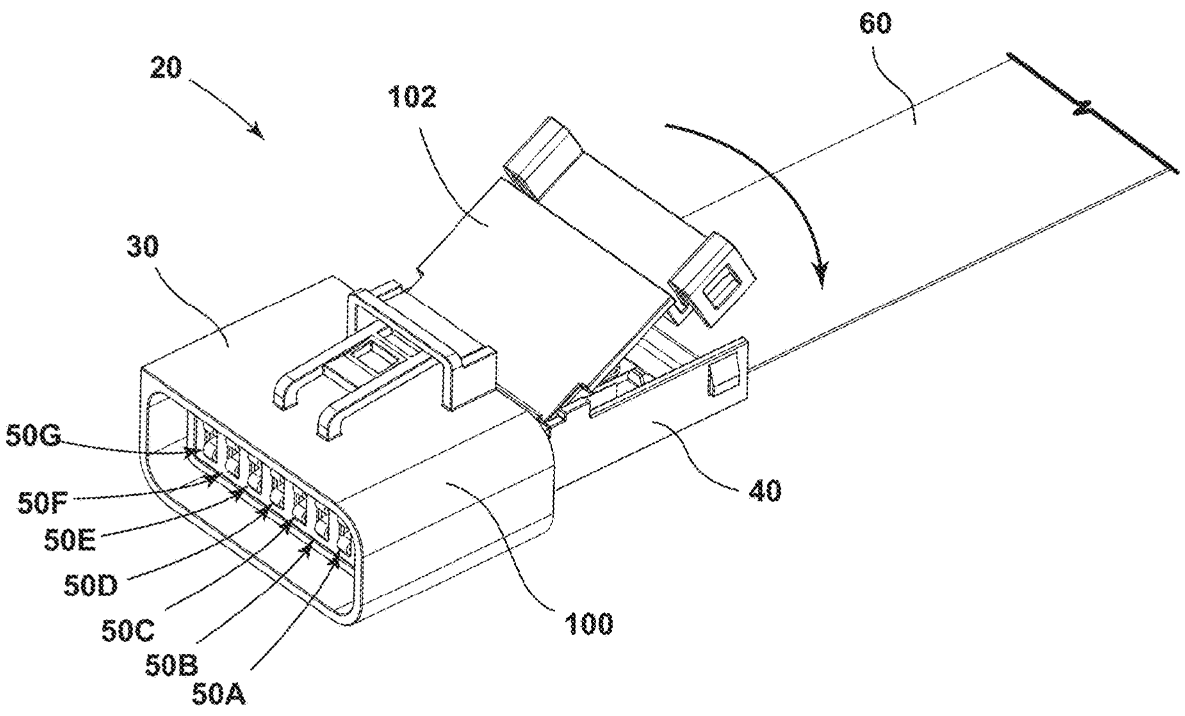

FIGS. 16-18 present a method of assembling an electrical assembly 20. The method includes connecting a first end 92A of a subassembly conductor 94 (e.g., first planar portion 132A) to a base 120 of a first terminal 90 (see, e.g., FIG. 11) and/or connecting a second end 92B of the conductor 94 (e.g., second planar portion 132B) to a tab 142 of a second terminal 96 (see, e.g., FIG. 12) to produce a terminal subassembly 50. In some examples, the method includes connecting a terminal subassembly 50 to an exposed conductor portion 80 of a flat cable 60. The number of subassemblies 50 of the assembly 20 may correspond to the number of exposed conductor portions 80. In some example configurations, a base 140 of each second terminal 96 of a subassembly 50 is connected (e.g., welded) to an exposed conductor portion 80.

Referring now to FIG. 16, the method includes inserting the first terminals 90 (e.g., first terminals 90A-90G) of the subassemblies 50 (e.g., subassemblies 50A-50G) into respective slots 70 (e.g., slots 70A-70G) of a tray 40. The method includes inserting the second terminals 96 (e.g., second terminals 96A-96G) and/or a portion of the cable 60 into a cavity 72 of the tray 40. Referring now to FIG. 17, the method includes inserting the tray 40 into a housing 30. Referring now to FIG. 18, the method includes rotating a cover 102 of the housing 30 to latch the housing 30 with the tray 40. In some implementations, rotating the cover 102 to latch the housing 30 with the tray 40 includes pressing the second terminals 96 and the exposed conductor portions 80 between the cover 102 and a protrusion 112 of the tray 40 to restrict movement of the flat cable 60 relative to the tray 40.

This Disclosure Includes, without Limitation, the Following Embodiments:

1. An assembly, comprising: a housing; a tray partially disposed within the housing and including a slot and a cavity, the tray formed separately from the housing; a flat cable including an electrical conductor with an exposed portion; and a terminal subassembly including a first terminal connected to a first end of a subassembly conductor and a second terminal connected to a second end of the subassembly conductor; wherein a portion of the flat cable is disposed in the cavity; a first portion of the terminal subassembly is disposed in the slot and a second portion of the terminal subassembly is disposed in the cavity; and the second terminal is electrically connected to the exposed portion of the electrical conductor.

2. The assembly according to embodiment 1, wherein the housing includes a body and a cover extending from the body; the body receives a portion of the tray; and the cover connects with an additional portion of the tray.

3. The assembly according to any preceding embodiment, wherein the cover is pivotally connected to the body; and the cover includes a planar first portion and a planar second portion offset from the planar first portion.

4. The assembly according to any preceding embodiment, wherein in a latched configuration, the cover and the tray apply a force to the second terminal and the flat cable in a direction perpendicular to the portion of the flat cable disposed in the cavity.

5. The assembly according to any preceding embodiment wherein the tray includes a plurality of additional slots; and the additional slots are disposed parallel to the slot and one another.

6. The assembly according to any preceding embodiment, wherein the tray includes a first tray end and a second tray end; and the slots extend from the first tray end and terminate before the second tray end.

7. The assembly according to any preceding embodiment, wherein the tray includes a protrusion disposed within the cavity and perpendicular to the slot; and a section of the flat cable is disposed between the cover and the protrusion.

8. The assembly according to any preceding embodiment, wherein the cover is engaged with the tray such that the cover restricts removal of the tray from the housing; the cover is latched with the tray such that the cover applies a force to the second terminal and the exposed portion of the electrical conductor; and the force is perpendicular to the portion of the flat cable in the cavity.

9. The assembly according to any preceding embodiment, wherein the first terminal includes a planar base and a connector that connects with an external object.

10. The assembly according to any preceding embodiment, wherein the second terminal includes a planar base, a tab extending from the planar base, and a projection extending from the planar base.

11. The assembly according to any preceding embodiment, wherein the tab is disposed proximate a first end of the second terminal and the projection is disposed proximate a second end of the second terminal; and the tab is disposed perpendicular to the projection and the planar base.

12. The assembly according to any preceding embodiment, wherein the subassembly conductor includes a non-planar portion and a rectangular cross-section.

13. The assembly according to any preceding embodiment, wherein the subassembly conductor includes a first planar portion and a second planar portion that are offset in a lateral direction and a longitudinal direction of the housing.

14. The assembly according to any preceding embodiment, wherein center lines of the second terminal and the exposed portion of the electrical conductor are aligned in the lateral direction; and the center lines of the second terminal and the exposed portion of the electrical conductor are offset in the lateral direction from a center line of the first terminal.

15. The assembly according to any preceding embodiment, wherein the subassembly conductor is perpendicular to the portion of the flat cable disposed in the cavity.

16. The assembly according to any preceding embodiment, including a plurality of additional terminal subassemblies including respective additional subassembly conductors, additional subassembly first terminals, and additional subassembly second terminals.

17. The assembly according to any preceding embodiment, wherein first and second planar portions of each of the respective additional subassembly conductors of the plurality of additional terminal subassemblies are offset in a lateral direction and a longitudinal direction; and the first and second planar portions of at least two additional subassembly conductors of the plurality of additional terminal subassemblies are offset in the lateral direction by different offset distances.

18. The assembly according to any preceding embodiment, wherein conductors of the flat cable connected to the at least two additional subassembly conductors have different widths; and the offset distances compensate for the different widths.

19. A method of assembling the assembly according to any preceding embodiment, comprising: welding the first end of the subassembly conductor of the terminal subassembly to a base of the first terminal; welding the second end of the subassembly conductor to a base of the second terminal; inserting the first terminal into the slot and the second terminal into the cavity; inserting the tray into the housing; and rotating a cover of the housing to latch the housing with the tray.

20. The method according to embodiment 19, wherein rotating the cover to latch the housing with the tray includes pressing the second terminal and the exposed portion of the electrical conductor between the cover and a protrusion of the tray to restrict movement of the flat cable relative to the tray.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. An assembly, comprising:

a housing;

a tray partially disposed within the housing and including a slot and a cavity, the tray formed separately from the housing;

a flat cable including an electrical conductor with an exposed portion; and a terminal subassembly including a first terminal connected to a first end of a subassembly conductor and a second terminal connected to a second end of the subassembly conductor;

wherein a portion of the flat cable is disposed in the cavity;

a first portion of the terminal subassembly is disposed in the slot and a second portion of the terminal subassembly is disposed in the cavity; and the second terminal is electrically connected to the exposed portion of the electrical conductor.

2. The assembly of claim 1, wherein:

the housing includes a body and a cover extending from the body;

the body receives a portion of the tray; and the cover connects with an additional portion of the tray.

3. The assembly of claim 2, wherein the cover is pivotally connected to the body; and the cover includes a planar first portion and a planar second portion offset from the planar first portion.

4. The assembly of claim 2, wherein in a latched configuration, the cover and the tray apply a force to the second terminal and the flat cable in a direction perpendicular to the portion of the flat cable disposed in the cavity.

5. The assembly of claim 2, wherein the tray includes a plurality of additional slots; and the additional slots are disposed parallel to the slot and one another.

6. The assembly of claim 5, wherein the tray includes a first tray end and a second tray end; and the slots extend from the first tray end and terminate before the second tray end.

7. The assembly of claim 5, wherein the tray includes a protrusion disposed within the cavity and perpendicular to the slot; and a section of the flat cable is disposed between the cover and the protrusion.

8. The assembly of claim 2, wherein:

the cover is engaged with the tray such that the cover restricts removal of the tray from the housing;

the cover is latched with the tray such that the cover applies a force to the second terminal and the exposed portion of the electrical conductor; and the force is perpendicular to the portion of the flat cable in the cavity.

9. The assembly of claim 1, wherein the first terminal includes a planar base and a connector that connects with an external object.

10. The assembly of claim 1, wherein the second terminal includes a planar base, a tab extending from the planar base, and a projection extending from the planar base.

11. The assembly of claim 10, wherein the tab is disposed proximate a first end of the second terminal and the projection is disposed proximate a second end of the second terminal; and the tab is disposed perpendicular to the projection and the planar base.

12. The assembly of claim 1, wherein the subassembly conductor includes a non-planar portion and a rectangular cross-section.

13. The assembly of claim 1, wherein the subassembly conductor includes a first planar portion and a second planar portion that are offset in a lateral direction and a longitudinal direction of the housing.

14. The assembly of claim 13, wherein center lines of the second terminal and the exposed portion of the electrical conductor are aligned in the lateral direction; and the center lines of the second terminal and the exposed portion of the electrical conductor are offset in the lateral direction from a center line of the first terminal.

15. The assembly of claim 1, wherein the subassembly conductor is perpendicular to the portion of the flat cable disposed in the cavity.

16. The assembly of claim 1, including a plurality of additional terminal subassemblies including respective additional subassembly conductors, additional subassembly first terminals, and additional subassembly second terminals.

17. The assembly of claim 16, wherein first and second planar portions of each of the respective additional subassembly conductors of the plurality of additional terminal subassemblies are offset in a lateral direction and a longitudinal direction; and the first and second planar portions of at least two additional subassembly conductors of the plurality of additional terminal subassemblies are offset in the lateral direction by different offset distances.

18. The assembly of claim 17, wherein conductors of the flat cable connected to the at least two additional subassembly conductors have different widths; and the offset distances compensate for the different widths.

19. A method of assembling the assembly of claim 1, comprising:

welding the first end of the subassembly conductor of the terminal subassembly to a base of the first terminal;

welding the second end of the subassembly conductor to a base of the second terminal;

inserting the first terminal into the slot and the second terminal into the cavity;

inserting the tray into the housing; and rotating a cover of the housing to latch the housing with the tray.

20. The method of claim 19, wherein rotating the cover to latch the housing with the tray includes pressing the second terminal and the exposed portion of the electrical conductor between the cover and a protrusion of the tray to restrict movement of the flat cable relative to the tray.

* * * * *